Patented Jan. 21, 1941

2,229,574

UNITED STATES PATENT OFFICE 2,229,574

PROCESS FOR THE PRODUCTION OF DIMETHYLHYDROQUINONES

Fritz Jung, Darmstadt, Germany, assignor to Merck & Co., Inc., Rahway, N. J., a corporation of New Jersey No Drawing. Application April 5, 1939, Serial No. 266,134. In Germany May 11, 1938

12 Claims. (Cl. 260—621)

This invention relates to processes for the production of dimethylhydroquinones.

I have now found that dimethylhydroquinones (xylohydroquinones) may be prepared by catalytic reduction of corresponding methyl-substituted p-quinones if certain special reaction conditions are maintained.

Three isomeric dimethylhydroquinones are possible corresponding to the following formulae:

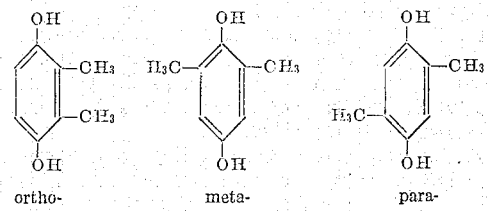

ortho-    meta-    para-

Heretofore, only very complicated processes have been available for the reduction of dimethylquinones as, for example, by treatment with sulfurous acid or with zinc dust and acetic acid, or through the action of stannous chloride and hydrochloric acid.

Such prior art processes are not suitable for the production of dimethylhydroquinones on a large scale, however, because the working up of the reaction mixture, especially the separation of the desired product from the excess and from the conversion products of the reduction agent, is complicated.

Also, since the solutions of dimethylhydroquinones are susceptible to attack by atmospheric oxygen, a less complicated process for the production of the dimethylhydroquinones is desirable.

It has previously been attempted, (see Comptes Rendus, vol. 146, [1908] p. 458), to produce the dimethylhydroquinones by catalytic reduction of the dimethylquinones, because in that case no residues of the reducing agent (hydrogen gas) remain in the reaction mixture and, therefore, the working up is relatively simple.

However, under the conditions described in the example of p-xylo-quinone (passing the gaseous quinone over a nickel catalyst, at 200° C.), only very poor yields of hydroquinone are obtained, because, under the conditions given, the hydroquinones themselves are reduced further (see Sabatier and Mailhe, Annales de Chimie et de Physique, vol. 16 [1909] p. 89–90).

Therefore, it has been the usual practice for many years to avoid attempts to reduce xyloquinones by catalytic reduction, and the reduction has preferably been effected with reducing chemicals, in spite of the disadvantages involved.

I have now found that under special reaction conditions the three isomeric xylo-quinones may be reduced catalytically to the corresponding pure dimethylhydroquinones, with practically quantitative yield. According to my invention, the special reaction conditions consist in working in solution, i. e., suspension, in an organic solvent, and at temperatures below approximately 150° C., preferably at ordinary temperatures. My findings with respect to the selective reaction temperature are surprising, in view of the observation by Sabatier and Mailhe (Annales de Chimie et de Physique, loc. cit., page 89, paragraph 3), that under the reaction conditions chosen by them, temperatures lower than about 200° C. lead to nuclear hydrogenation.

As catalysts in my improved process may be employed the usual hydrogenation catalysts, such as the precious metal catalysts, as well as catalysts from the series of non-precious metals, as, for example, Raney nickel.

Among the solvents which may be employed may be mentioned, for example, distilled alcohol, distilled toluene, ether, etc. Temperatures up to about 150° C. and increased pressures may be employed, but are not essential for the selective hydrogenation desired, and, preferably, the process is carried out at ordinary temperatures and pressures.

In general, in the process according to my invention, taking up of hydrogen automatically ceases when the calculated theoretical quantity is taken up. The quantity of catalyst required may be comparatively small.

In the following examples I am illustrating certain specific embodiments of my invention without, however, being limited strictly thereto.

It will be understood by those skilled in the art, and in view of the teachings herein, that various modifications may be made in the examples without departing from the spirit and scope of my invention.

Example I

About 40 gms. of o-xylo-quinone in about 750 cc. of methanol are shaken at room temperature with $H_2$, after addition of about 5 gms. of 10% palladium charcoal. After discoloration of the solution and completion of the hydrogen absorption within about 45 min., the solution is filtered, with the exclusion of air, and evaporated to dryness under vacuo in a $CO_2$ atmosphere. On recrystallization from water, a yield of about 38 gms. of o-xylo-hydroquinone is obtained. It has a melting point of about 222° C.

Example II

A solution of about 197 gms. of m-xylo-quinone in 2 liters of methanol is shaken at room temperature with $H_2$, in the presence of about 10 gms. of 10% palladium charcoal. The $H_2$ absorption stops at the end of about one hour. After filtering off the catalyst, the solution is evaporated to dryness in vacuo in a $CO_2$ atmosphere. On recrystallization from water, there is obtained a yield of about 99% of m-xylo-hydroquinone. It has a melting point of about 151° C.

Example III

About 111 gms. of p-xylo-quinone is dissolved in about 1 liter of methanol and shaken at about 40° C. with hydrogen in the presence of about 10 gms. of palladium charcoal. The calculated quantity of hydrogen gas is taken up in about 10 minutes. After filtering off the catalyst, the methanol is evaporated in vacuo in $CO_2$ atmosphere, and the p-xylo-hydroquinone is recrystallized from methanol. The yield obtained is about 105 gms. The product has a melting point of about 215° C.

I claim as my invention:

1. The process comprising hydrogenating xyloquinones in an organic solvent which is inert in the hydrogenation process, in the presence of a hydrogenation catalyst at a temperature not greater than 150° C.

2. The process comprising hydrogenating xyloquinones in an organic solvent which is inert in the hydrogenation process, in the presence of a hydrogenation catalyst under ordinary temperature conditions.

3. The process comprising hydrogenating o-xylo-quinone in an organic solvent which is inert in the hydrogenation process, in the presence of a hydrogenation catalyst and at a temperature not greater than 150° C.

4. The process comprising hydrogenating o-xylo-quinone in an organic solvent which is inert in the hydrogenation process, in the presence of a hydrogenation catalyst under ordinary temperature conditions.

5. The process comprising hydrogenating m-xylo-quinone in an organic solvent which is inert in the hydrogenation process, in the presence of a hydrogenation catalyst and at a temperature not greater than 150° C.

6. The process comprising hydrogenating m-xylo-quinone in an organic solvent which is inert in the hydrogenation process, in the presence of a hydrogenation catalyst under ordinary temperature conditions.

7. The process comprising hydrogenating p-xylo-quinone in an organic solvent which is inert in the hydrogenation process, in the presence of a hydrogenation catalyst and at a temperature not greater than 150° C.

8. The process comprising hydrogenating p-xylo-quinone in an organic solvent which is inert in the hydrogenation process, in the presence of a hydrogenation catalyst under ordinary temperature conditions.

9. The process comprising hydrogenating o-xylo-quinone in an organic solvent which is inert in the hydrogenation process, in the presence of catalytically active palladium, at a temperature not greater than 150° C.

10. The process comprising hydrogenating m-xylo-quinone in an organic solvent which is inert in the hydrogenation process, in the presence of catalytically active palladium, at a temperature not greater than 150° C.

11. The process comprising hydrogenating p-xylo-quinone in an organic solvent which is inert in the hydrogenation process, in the presence of catalytically active palladium, at a temperature not greater than 150° C.

12. The process comprising hydrogenating xylo-quinones in an organic solvent which is inert in the hydrogenation process, in the presence of a hydrogenation catalyst, at a temperature not greater than 150° C., filtering off the catalyst, and recovering the corresponding dimethylhydroquinone.

FRITZ JUNG.